US008308970B2

(12) United States Patent
Hirano et al.

(10) Patent No.: US 8,308,970 B2
(45) Date of Patent: Nov. 13, 2012

(54) ACID-BASE MIXTURE AND ION CONDUCTOR COMPRISING THE SAME

(75) Inventors: Tetsuji Hirano, Yamaguchi (JP); Nobuharu Hisano, Yamaguchi (JP); Masayuki Kinouchi, Yamaguchi (JP)

(73) Assignee: UBE Industries, Ltd., Yamaguchi (JP)

(*) Notice: Subject to any disclaimer, the term of this patent is extended or adjusted under 35 U.S.C. 154(b) by 2 days.

(21) Appl. No.: 12/617,580

(22) Filed: Nov. 12, 2009

(65) Prior Publication Data

US 2010/0112415 A1    May 6, 2010

Related U.S. Application Data

(62) Division of application No. 10/561,519, filed as application No. PCT/JP2004/009801 on Jul. 9, 2004, now abandoned.

(30) Foreign Application Priority Data

Jul. 11, 2003  (JP) .................................. 2003-195428
Jul. 11, 2003  (JP) .................................. 2003-195429

(51) Int. Cl.
*H01G 9/022*    (2006.01)
*H01G 9/035*    (2006.01)
*H01G 9/038*    (2006.01)
*H01M 8/00*    (2006.01)

(52) U.S. Cl. ...................................... 252/62.2; 429/498
(58) Field of Classification Search ................... 252/62.2
See application file for complete search history.

(56) References Cited

U.S. PATENT DOCUMENTS

| 3,329,652 | A | 7/1967 | Christie |
| 3,356,645 | A | 12/1967 | Warren |
| 3,632,427 | A | 1/1972 | Green |
| 4,331,582 | A | 5/1982 | Babayan |
| 4,762,631 | A | 8/1988 | Shinozaki et al. |
| 5,508,328 | A | 4/1996 | Olson |
| 6,120,696 | A | 9/2000 | Armand et al. |
| 6,264,857 | B1 | 7/2001 | Kreuer et al. |
| 6,441,064 | B1 | 8/2002 | Shah et al. |
| 2003/0091905 | A1* | 5/2003 | Nobuta et al. ................ 429/347 |

FOREIGN PATENT DOCUMENTS

| JP | 48-5900 | 1/1973 |
| JP | 55-075421 | 6/1980 |
| JP | 57-190018 | 11/1982 |
| JP | 01-299274 | 12/1989 |
| JP | 01-299275 | 12/1989 |
| JP | 2000-3620 | 1/2000 |
| JP | 2000-16983 | 1/2000 |
| JP | 2001-167630 | 6/2001 |
| JP | 2002-75797 | 3/2002 |
| JP | 2002-255941 | 9/2002 |
| JP | 2002-313414 | 10/2002 |
| JP | 2003-123791 | 4/2003 |

OTHER PUBLICATIONS

European Patent Office issued a European Search Report dated Apr. 20, 2010, Application No. 04747269.1.
Takashi Kamon et al., "The Curing of Epoxy Resins (VI)—The Curing of Epoxy Resins with Acid Salts of Imidazoles", Shikizai Kyokaishi, Journal of Japan Society of Colour Material, vol. 50, No. 1, 1977, pp. 1-7.
Ionsei Ekitai, Kaihatsu no Saizensen to Mirai, CMC Publishing Co., Ltd., Feb. 1, 2003, pp. 28-31.
The Journal of Physical Chemistry B, vol. 107, No. 17, May 1, 2003, pp. 4024-4030.
Susan et al., "Bronsted acid-base ionic liquids and their use as new materials for anhydrous proton conductors", Chem. Commun., 2003, pp. 938-939.
Susan et al., "Development of New Materials to Realize Fast Proton Conductors under Anhydrous Condition", Proceedings of the 43rd Battery Symposium in Japan, Oct. 12, 2002, pp. 102-103.
Nakamoto et al., "Novel Acid—Base Ionic Liquids for Anhydrous Proton Conductors", Proceedings of the 43rd Battery Symposium in Japan, Oct. 12, 2002, pp. 604-605.
Kreuer et al., "Imidazole and pyrazole-based proton conducting polymers and liquids", Electrochimica Acta, vol. 43, Nos. 10-11, 1998, pp. 1281-1288.

* cited by examiner

*Primary Examiner* — Peter F Godenschwager
(74) *Attorney, Agent, or Firm* — Young & Thompson

(57) ABSTRACT

An acid-base mixture composed of a base component and an acid component wherein at least either the base component or the acid component is composed of at least two different compounds is characterized in that at least one base in the base component is represented by the formula (1) below. An ion conductor is characterized by being composed of an acid-base mixture which is composed of a base component composed of a base represented by the formula (2) below and an acid component. (In the formula (1), $R^1$, $R^2$ and $R^3$ represent a hydrocarbon group having 1-20 carbon atoms or a hydrogen atom, and at least one of them is a hydrocarbon group.) (In the formula (2), $R^1$, $R^2$ and $R^3$ represent a hydrocarbon group having 1-20 carbon atoms or a hydrogen atom, and $R^1$ and $R^3$ are not the same.)

16 Claims, 4 Drawing Sheets

[Fig. 1]
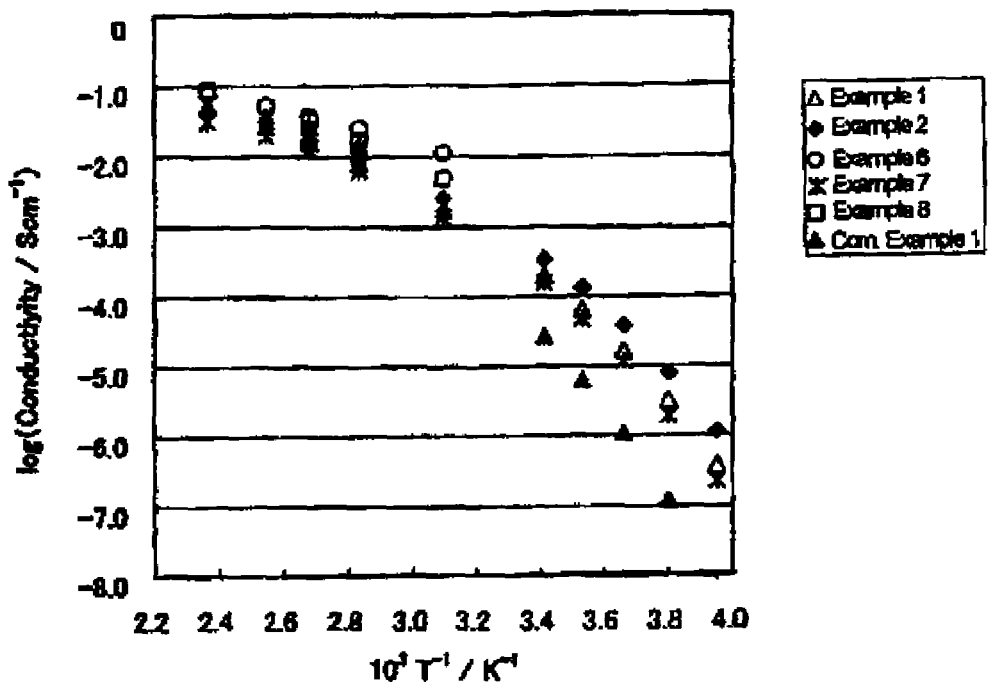
[Fig. 2]
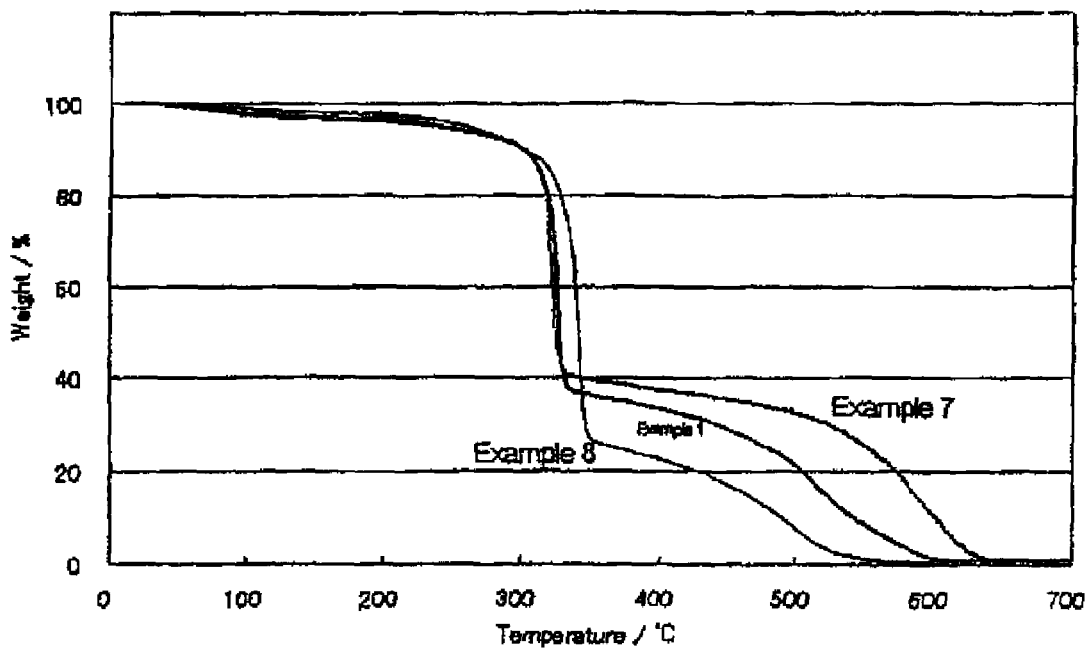

[Fig. 3]
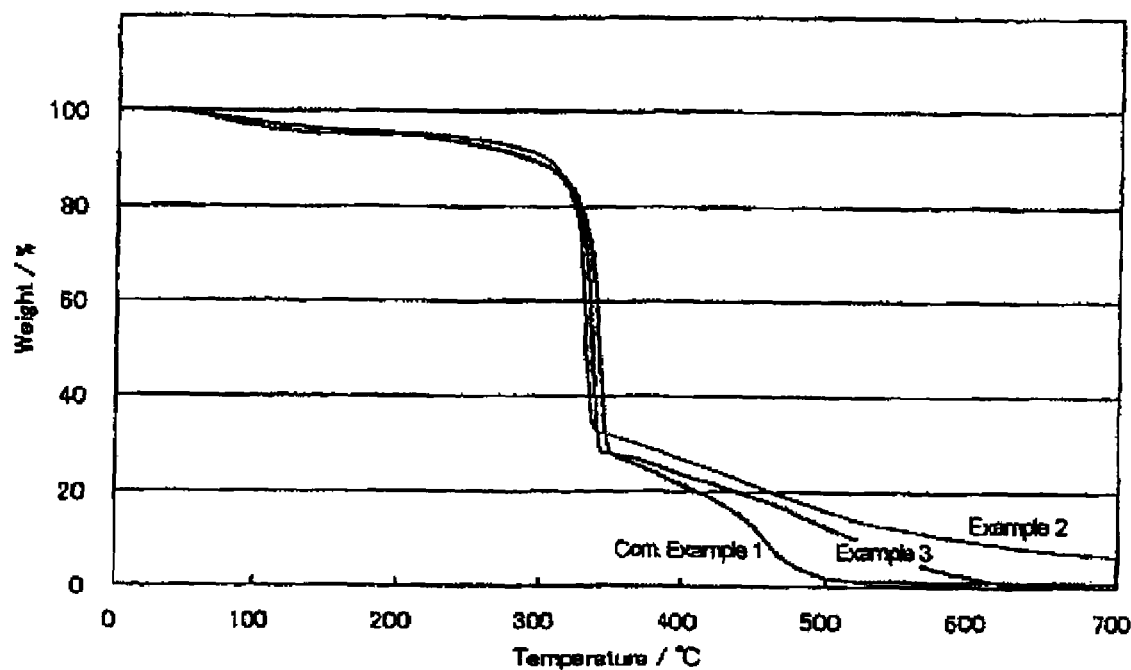
[Fig. 4]
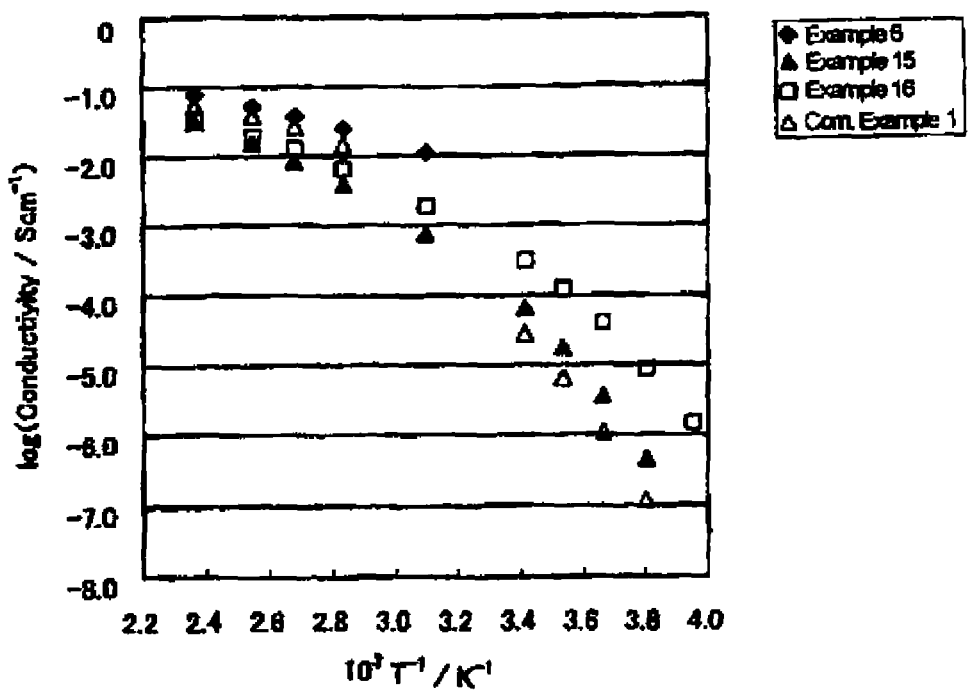

[Fig. 5]
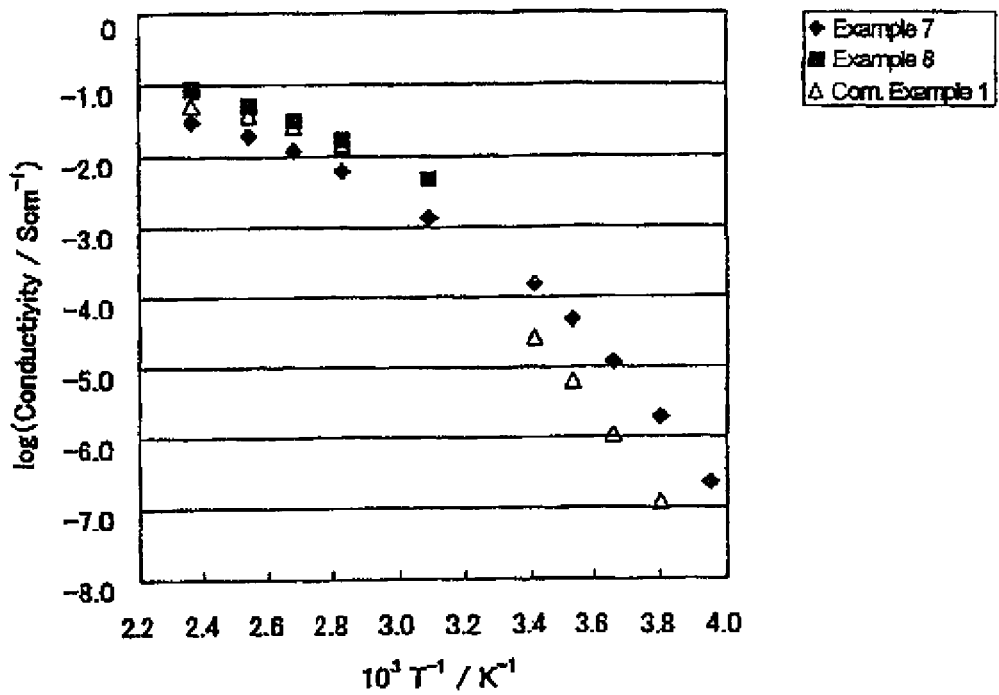
[Fig. 6]
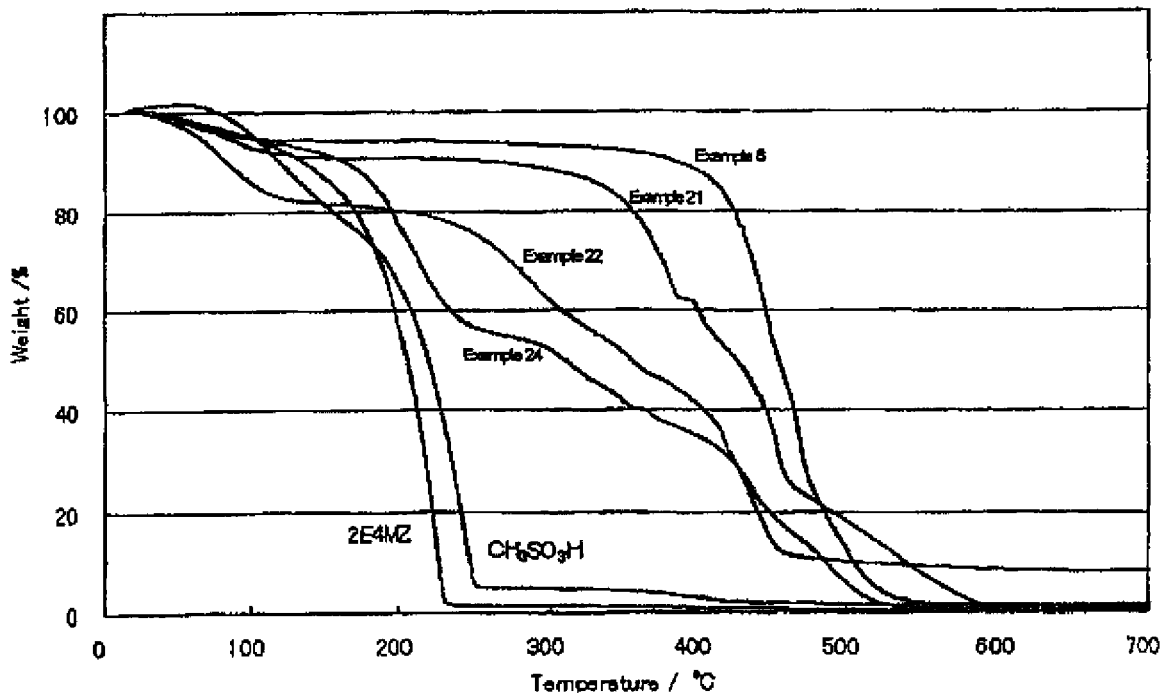

[Fig. 7]
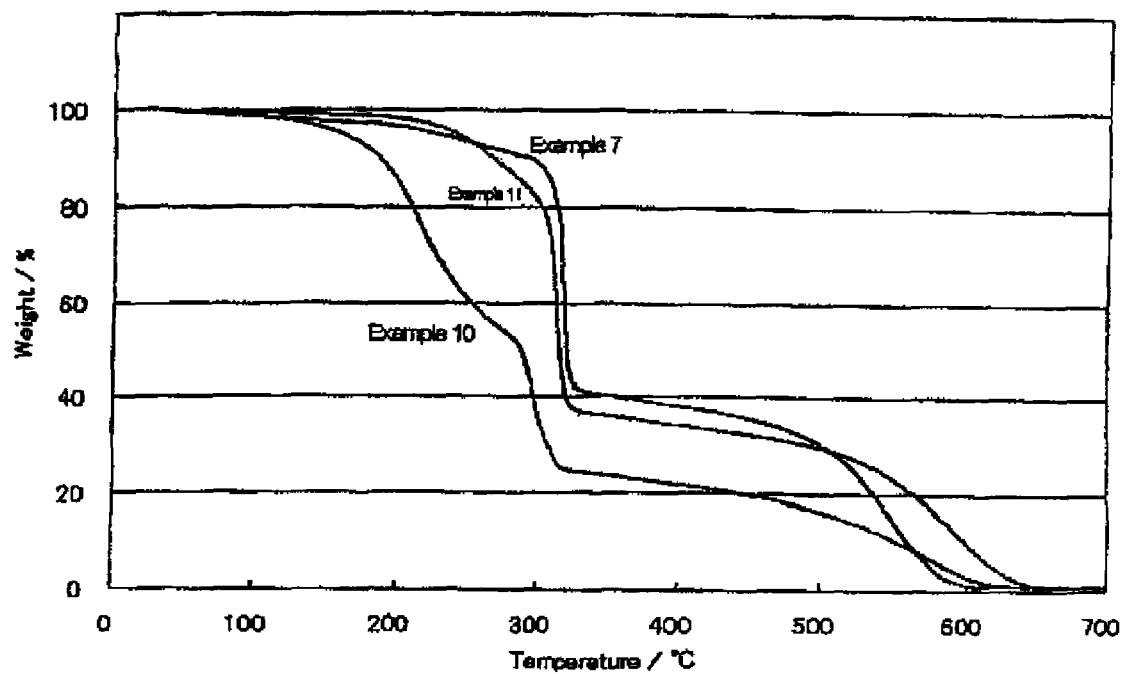
[Fig. 8]
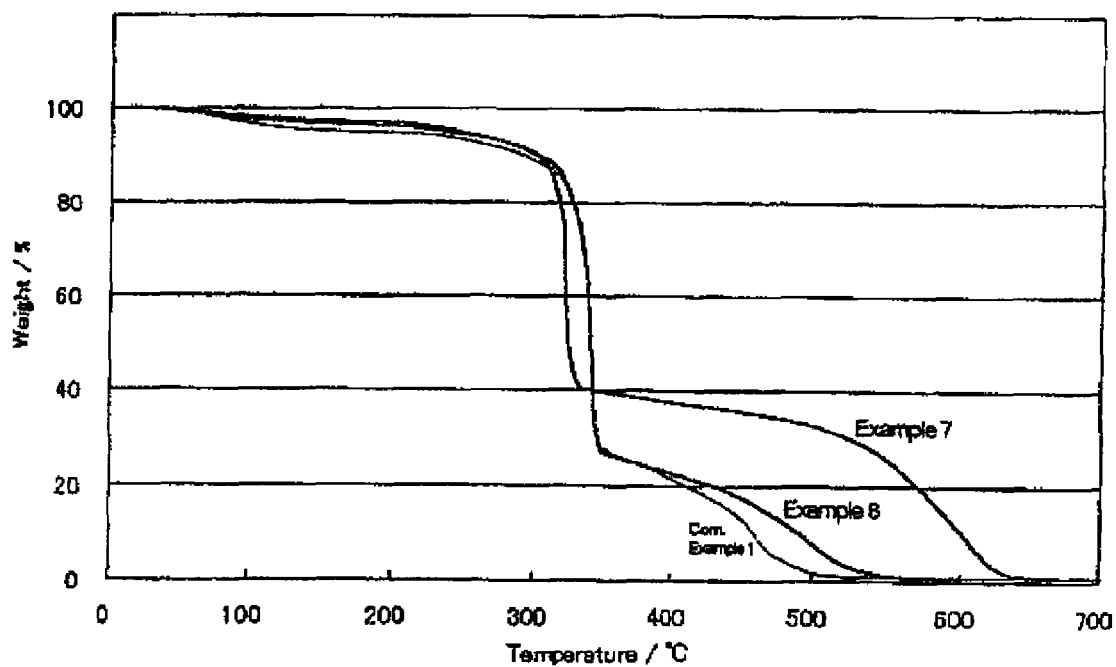

ACID-BASE MIXTURE AND ION CONDUCTOR COMPRISING THE SAME

FIELD OF THE INVENTION

The present invention relates to a mixture of a base component and an acid component and an ion conductor comprising the same. The ion conductor of the present invention is useful in fuel cells, secondary batteries, electric double layer capacitors, electrolytic capacitors, etc.

BACKGROUND OF THE INVENTION

Imidazolium salts are well known to be useful as an epoxy resin curing agent. While most of imidazolium salts are solid, JP-A-57-190018 (Patent Document 1) discloses a 2-ethylhexanoate or an acetate of an imidazole compound as an epoxy resin cure accelerator that is liquid at room temperature. Journal of Japan Society of Colour Material, 50 (1), 2-7 (1977) (Non-Patent Document 1) teaches that an imidazole compound salt with an alkylcarboxylic acid or a phosphoric acid is liquid at room temperature and reports epoxy resin curing by the use of the salt. JP-A-48-5900 (Patent Document 2) discloses an epoxy resin composition containing a sulfonate of an imidazole compound as a curing agent or a cure accelerator. U.S. Pat. No. 3,356,645 (Patent Document 3) discloses a carboxylate, a lactate, and a phosphate of an imidazole compound. All the references cited above neither describe nor suggestion conductivity of these salts.

Some of ammonium salts such as imidazolium salts and pyridium salts are known to become a liquid molten salt at or below 100° C., particularly around room temperature and to exhibit high ion conductivity at relatively low temperatures of 200° C. or lower without using water or an organic solvent. Such molten salts have been studied for applicability as an electrolyte of batteries and the like for their characteristic nonvolatility. Known ionic liquids include a number of imidazole salts or pyridine salts having a substituent introduced to their N-position(s) (see Hiroyuki Ohno (ed.), Ionsei Ekitai—Kaihatsu no Saizensen to Mirai—, CMC Publishing Co., Ltd., 28-31 (2003): Non-Patent Document 2).

Watanabe, et al. report protic, room-temperature molten salts in J. Phys. Chem. B., 107 (17), 4024-4030 (2003) (Non-Patent Document 3), Chem. Commun., 938-939 (2003) (Non-Patent Document 4), Proceedings of The 43rd Battery Symposium in Japan, 102-103 (2002) (Non-Patent Document 5), and ibid., 604-605 (2002) (Non-Patent Document 6). The reported protic, room-temperature molten salts are prepared basically using an amine compound with the positions other than the N-position unsubstituted.

Kreuer, et al. report a proton conductor composed of unsubstituted imidazole and sulfuric acid in Electrochimica Acta, Vol. 43, No. 10-11, 1281-1288 (1998) (Non-Patent Document 7). JP-T-2000-517462 (Patent Document 4) discloses a proton conductor containing an acid and a nonaqueous amphoteric material. The imidazole compounds having a substituent at a position other than the 1,3-positions which are disclosed therein are given as a general formula having one substituent at such a position. The description is absent on limitation of the position of the substituent. The imidazole compound actually used in the description is an unsubstituted compound.

Armand et al. (JP-T-2000-508114: Patent Document 5) discloses a proton conductor in liquid form comprising a mixture of an acid addition salt of a nitrogen base and a nitrogen base, wherein the acid of the acid addition salt is a fluorine-based acid. The fluorine-based acid involves cost and environmental concerns in the production. Use of the basic component (nitrogen base) in excess lowers the melting point but reduces heat resistance.

Patent Document 1: JP-A-57-190018
Patent Document 2: JP-A-48-5900
Patent Document 3: U.S. Pat. No. 3,356,645
Patent Document 4: JP-T-2000-517462
Patent Document 5: JP-T-2000-508114
Non-Patent Document 1: Journal of Japan Society of Colour Material, 50 (1), 2-7 (1977)
Non-Patent Document 2: Ionsei Ekitai—Kaihatsu no Saizensen to Mirai—, CMC Publishing Co., Ltd., 28-31 (2003)
Non-Patent Document 3: J. Phys. Chem. B., 107 (17), 4024-4030 (2003)
Non-Patent Document 4: Chem. Commun., 938-939 (2003)
Non-Patent Document 5: Proceedings of The 43rd Battery Symposium in Japan, 102-103 (2002)
Non-Patent Document 6: Proceedings of The 43rd Battery Symposium in Japan, 604-605 (2002)
Non-Patent Document 7: Electrochimica Acta, Vol. 43, No. 10-11, 1281-1288 (1998)

SUMMARY OF THE INVENTION

An object of the present invention is to provide an ion conductive acid-base mixture having a relatively low melting point and an ion or proton conductor containing the mixture.

The present invention accomplishes the above object by providing an acid-base mixture composed of a base component and an acid component and an ion or proton conductor containing the mixture. At least one of the base component and the acid component includes at least two compounds. The base component contains at least one compound represented by chemical formula (1) shown below (The acid-base mixture will hereinafter be referred to as "the acid-base mixture of the first aspect).

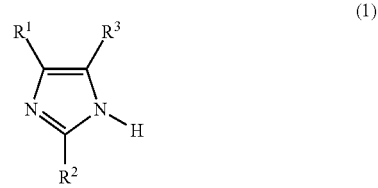

wherein $R^1$, $R^2$, and $R^3$ each represent a hydrogen atom or a hydrocarbon group having The present invention also accomplishes the above object by providing an ion conductor comprising an acid-base mixture composed of a base component containing a base represented by chemical formula (2) shown below and an acid component (The ion conductor will hereinafter be referred to as the ion conductor of the second aspect).

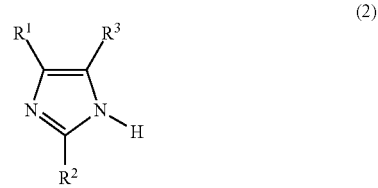

wherein $R^1$, $R^2$, and $R^3$ each represent a hydrogen atom or a hydrocarbon group having 1 to 20 carbon atoms, provided that $R^1$ and $R^3$ are different.

BRIEF DESCRIPTION OF THE DRAWINGS

FIG. 1 is a graph showing the temperature dependence of the ion conductivity of the acid-base mixtures prepared in Examples 1, 2, 6, 7, and 8 and Comparative Example 1.

FIG. 2 is a graph showing the results of thermogravimetric analysis on the acid-base mixtures of Examples 1, 7, and 8.

FIG. 3 is a graph showing the results of thermogravimetric analysis on the acid-base mixtures of Examples 2 and 3 and Comparative Example 1.

FIG. 4 is a graph showing the temperature dependence of the ion conductivity of the acid-base mixtures of Examples 6, 15, and 16 and Comparative Example 1.

FIG. 5 is a graph showing the temperature dependence of the ion conductivity of the acid-base mixtures of Examples 7 and 8 and Comparative Example 1.

FIG. 6 is a graph showing the results of thermogravimetric analysis on the acid-base mixtures of Examples 6, 21, 22, and 24, 2E4MZ, and methanesulfonic acid.

FIG. 7 is a graph showing the results of thermogravimetric analysis on the acid-base mixtures of Examples 7, 10, and 11.

FIG. 8 is a graph showing the results of thermogravimetric analysis on the acid-base mixtures of Examples 7 and 8 and Comparative Example 1.

DETAILED DESCRIPTION OF THE INVENTION

The acid-base mixture of the first aspect will be described first.

The acid-base mixture of the first aspect is composed of a base component and an acid component. At least one of the base component and the acid component includes at least two compounds. The base component contains at least one base represented by chemical formula (1) shown below, preferably a base represented by chemical formula (2) shown below.

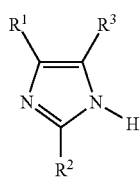

(1)

wherein $R^1$, $R^2$, and $R^3$ each represent a hydrogen atom or a hydrocarbon group having 1 to 20 carbon atoms, provided that at least one of them is a hydrocarbon group.

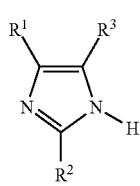

(2)

wherein $R^1$, $R^2$, and $R^3$ each represent a hydrogen atom or a hydrocarbon group having 1 to 20 carbon atoms, provided that $R^1$ and $R^3$ are different.

Preferred examples of the hydrocarbon group having 1 to 20 carbon atoms include straight-chain or branched alkyl groups and aromatic groups. Specific examples are methyl, ethyl, n-propyl, isopropyl, n-butyl, isobutyl, sec-butyl, tert-butyl, hexyl, phenyl, and benzyl, with methyl and ethyl being particularly preferred.

The bases represented by chemical formulae (1) or (2) include imidazoles having an alkyl group at a position other than the N-positions of the ring, such as monoalkylimidazoles, e.g., 2-alkylimidazoles and 4-alkylimidazoles, and 2,4-dialkylimidazoles.

Specific examples of the above-described bases include 2-alkylimidazoles, such as 2-methylimidazole and 2-ethylimidazole; 4-alkylimidazoles, such as 4-methylimidazole and 4-ethylimidazole; 2,4-dialkylimidazoles, such as 2-ethyl-4-methylimidazole, 2-octyl-4-hexylimidazole, 2-cyclohexyl-4-methylimidazole, and 2-butyl-4-allylimidazole; 2-phenylimidazole, 4-phenylimidazole, and 2-ethyl-4-phenylimidazole.

Preferred of them are 2-ethyl-4-methylimidazole, 4-methylimidazole, and 2-ethylimidazole.

Where the acid component is a single compound, the base component is a mixture of two or more of the above-described bases. Where the acid component is a mixture of two or more compounds, the base component may be either a single compound or a mixture of two or more compounds selected from the above-described bases. Where the base component is a mixture of two or more compounds, one of them may be unsubstituted imidazole. In this case, the proportion of unsubstituted imidazole in the base component is preferably 90% by weight or less, still preferably 60% by weight or less.

Suitable combinations of two or more bases include a mixture of 2-ethyl-4-methylimidazole and 4-methylimidazole, a mixture of 2-ethyl-4-methylimidazole and 2-ethylimidazole, a mixture of 2-ethyl-4-methylimidazole and imidazole, and a mixture of 2-ethylimidazole and 4-methylimidazole.

The acid component that can be used in the first aspect of the invention includes sulfonic acids, sulfonic acid compounds, carboxylic acids, and inorganic acids. It is preferred that at least one compound making up the acid component be an inorganic acid. Examples of the acid component include organic aliphatic or aromatic sulfonic acids, such as p-toluenesulfonic acid, methanesulfonic acid, and trifluoromethanesulfonic acid; and aromatic or aliphatic carboxylic acids. Preferred inorganic acids include inorganic mineral acids, such as sulfuric acid, phosphoric acid, and perchloric acid. The acid component is preferably an acid containing no fluorine atom in its structure. Sulfuric acid, phosphoric acid, etc. are advantageous from the standpoint of cost. Methanesulfonic acid, etc. are advantageous from the standpoint of ease of handling.

Where the base component is a mixture of two or more bases, the acid component may be either one or a mixture of two or more selected from the above-recited acids. Where the base component is a single compound, the acid component should be a mixture of two or more of the above-described acids.

Suitable combinations of the acid component and the base component include: a combination of 2-ethyl-4-methylimidazole/4-methylimidazole and sulfuric acid (2E4MZ/4MI.$H_2SO_4$), a combination of 2-ethyl-4-methylimidazole/2-ethylimidazole and sulfuric acid (2E4MZ/2EI.$H_2SO_4$), a combination of 2-ethyl-4-methylimidazole/imidazole and sulfuric acid (2E4MZ/Im.$H_2SO_4$), and a combination of 2-ethylimidazole/4-methylimidazole and sulfuric acid (2EI/4MI.$H_2SO_4$).

The mixing ratio of the base component to the acid component preferably ranges from 99:1 to 1:99, still preferably from 95:1 to 1:95, by mole. It is not preferred that the ratio of the base component or the acid component exceeds the recited range because the heat resistance reduces. A particularly preferred mixing ratio of the base component and the acid component is 1:1 (an equimolar mixture).

The acid-base mixture of the first aspect is preferably an acid-base mixture having a melting point of 120° C. or lower or a liquid acid-base mixture showing no melting point.

It is particularly preferred that the acid-base mixture of the first aspect be an acid-base mixture that is liquid at room temperature or an acid-base mixture having a glass transition temperature of 25° C. or lower.

The acid-base mixture of the first aspect is preferably an ion conductor having an ion conductivity of, for example, $10^{-4}$ Scm$^{-1}$ or higher at 100° C. The acid-base mixture of the first aspect is superior in ion conductivity in a low temperature region of room temperature or lower.

The ion conductor according to the second aspect of the invention will then be described.

The ion conductor of the second aspect comprises an acid-base mixture composed of a base component containing a base represented by chemical formula (2) shown below and an acid component.

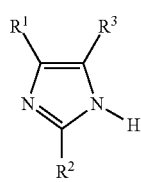

(2)

wherein $R^1$, $R^2$, and $R^3$ each represent a hydrogen atom or a hydrocarbon group having 1 to 20 carbon atoms, provided that $R^1$ and $R^3$ are different.

Preferred examples of the hydrocarbon group having 1 to 20 carbon atoms include straight-chain or branched alkyl groups and aromatic groups. Specific examples are methyl, ethyl, n-propyl, isopropyl, n-butyl, isobutyl, sec-butyl, tert-butyl, hexyl, phenyl, and benzyl, with methyl and ethyl being particularly preferred.

The base represented by chemical formula (2) used in the second aspect is an asymmetric imidazole compound in which the substituents $R^1$ and $R^3$ are not the same.

Such asymmetric imidazole compounds include monoalkylimidazoles having one alkyl group at a position other than the N-positions of the ring, such as 4-alkylimidazoles.

Specific examples include 4-alkylimidazoles such as 4-methylimidazole and 4-ethylimidazole, and 4-phenylimidazole.

The asymmetric imidazole compounds further include those having an alkyl group at two or more positions other than the N-positions of the ring, such as 2,4-dialkylimidazoles.

Specific examples include 2,4-dialkylimidazoles such as 2-ethyl-4-methylimidazole, 2-octyl-4-hexylimidazole, 2-cyclohexyl-4-methylimidazole, and 2-butyl-4-allylimidazole, and 2-ethyl-4-phenylimidazole.

Of the asymmetric imidazole compounds described above, preferred are 4-methylimidazole and 2-ethyl-4-methylimidazole.

The base component used in the second aspect may be either one of the above-described bases or a mixture of two or more of them. Where a mixture of two or more bases is used, one of them may be unsubstituted imidazole or a symmetric imidazole compound such as a 2-alkylimidazole or 2-phenylimidazole. Examples of the 2-alkylimidazole are 2-methylimidazole and 2-ethylimidazole. In this case, the proportion of the unsubstituted imidazole or the symmetric imidazole compound in the base component is preferably 90% by weight or less, still preferably 60% by weight or less.

Suitable combinations of the two or more bases include a mixture of 2-ethyl-4-methylimidazole and 4-methylimidazole, a mixture of 2-ethyl-4-methylimidazole and 2-ethylimidazole, a mixture of 2-ethyl-4-methylimidazole and imidazole, and a mixture of 4-methylimidazole and 2-ethylimidazole.

The acid component that can be used in the second aspect includes the acids described for use in the first aspect of the invention, which can be used either individually or as a mixture of two or more thereof.

Suitable combinations of the acid component and the base component include: combination of 2-ethyl-4-methylimidazole and trifluoromethanesulfonic acid (2E4MZ.HTf), a combination of 4-methylimidazole and sulfuric acid (4MI.H$_2$SO$_4$), a combination of 2-ethyl-4-methylimidazole/ 4-methylimidazole and sulfuric acid (2E4MZ/4MI.H$_2$SO$_4$), a combination of 2-ethyl-4-methylimidazole/2-ethylimidazole and sulfuric acid (2E4MZ/2EI.H$_2$SO$_4$), a combination of 2-ethyl-4-methylimidazole/imidazole and sulfuric acid (2E4MZ/Im.H$_2$SO$_4$), a combination 4-methylimidazole/2-ethylimidazole and sulfuric acid (4MI/2EI.H$_2$SO$_4$), and a combination of 2-ethyl-4-methylimidazole and methanesulfonic acid (2E4MZ.CH$_3$SO$_3$H).

The mixing ratio of the base component to the acid component preferably ranges from 99:1 to 1:99, still preferably from 95:1 to 1:95, by mole. If the ratio of the base component or the acid component exceeds the recited range, the heat resistance reduces. A particularly preferred mixing ratio of the base component and the acid component is 1:1 (an equimolar mixture).

The ion conductor of the second aspect contains the acid-base mixture composed of the base component and the acid component and exhibits an ion conductivity of, for example, $10^{-4}$ Scm$^{-1}$ or higher at 100° C. The ion conductor of the second aspect is superior in ion conductivity in a low temperature region of room temperature or lower.

The ion conductor of the second aspect is preferably one having a melting point of 120° C. or lower or a liquid one with no melting point.

It is particularly preferred for the ion conductor of the second aspect to have a glass transition temperature of 25° C. or lower.

EXAMPLES

The present invention will now be illustrated in greater detail with reference to Examples and Comparative Examples. Measurements in Examples and Comparative Examples were made in accordance with the following methods.

(1) Measurement of Ion Conductivity

A dried sample was put in a sample bottle. Platinum plates measuring 1.5 cm wide and 2 cm long were immersed in the sample in parallel with each other at a 1 cm distance. The sample bottle was closed to make a cell for conductivity measurement. The ionic conductivity was obtained by complex impedance measurement with FRD 1025 and Potentiostat/Galvanostat 283, supplied by Princeton Applied Research, in a thermostat set at a prescribed temperature.

(2) Melting Point

Measured with DSC-7 from Perkin-Elmer Inc. or DSC-50 from Shimadzu Corp. at a rate of temperature rise of 10° C./min in a helium stream.

(3) Thermogravimetry

Carried out with TGA-50 from Shimadzu Corp. in air at a rate of temperature rise of 10° C./min.

Example 1

Mixture of 2-ethyl-4-methylimidazole/4-methylimidazole and Sulfuric Acid (2E4MZ/4MI.$H_2SO_4$; Molar Ratio=1:1:2)

In 12.7 g of 2E4MZ (from Shikoku Chemicals Corp.) was added dropwise 6 ml of 98% sulfuric acid in a nitrogen atmosphere while stirring. After 2 hour stirring, 20.5 g of 4MI.$H_2SO_4$ prepared in Example 8 given later was added thereto, followed by stirring overnight at room temperature. The mixture was dried under reduced pressure at 110° C. for 6 hours to remove water to give 2E4MZ/4MI.$H_2SO_4$ (molar ratio=1:1:2). The acid-base mixture maintained the liquid state for more than 4 months. The results of DSC showed no melting point and a Tg of −54° C. The temperature dependence of the ion conductivity of the acid-base mixture is shown in FIG. 1.

Example 2

Mixture of 2-ethyl-4-methylimidazole/2-ethylimidazole and Sulfuric Acid (2E4MZ/2EI.$H_2SO_4$; Molar Ratio=1:1:2)

In a flask were put 15.7 g of 2E4MZ and 13.7 g of 2EI (from Aldrich), and the 2EI was melted at 100° C. to make a uniform mixture. Into the mixture was added dropwise 15 ml of 98% sulfuric acid in a nitrogen atmosphere while stirring. The mixture was stirred at room temperature overnight, followed by drying under reduced pressure at 110° C. for 6 hours to remove water thereby to give 2E4MZ/2EI.$H_2SO_4$ (molar ratio=1:1:2). The resulting acid-base mixture maintained the liquid state for more than 5 months. The DSC results revealed no melting point and a Tg of −61° C. The temperature dependence of the ion conductivity of the acid-base mixture is shown in FIG. 1. Owing to the mixed base system, the acid-base mixture of Example 2 exhibited improvement in ion conductivity in a low temperature region over the acid-base mixture of Comparative Example 1 hereinafter given.

Example 3

Mixture of 2-ethyl-4-methylimidazole/imidazole and Sulfuric Acid (2E4MZ/Im.$H_2SO_4$; Molar Ratio=1:1:2)

In 30 ml of ethanol were dissolved 5.17 g of 2E4MZ and 3.20 g of imidazole (from Sigma). The solution was cooled in an ice bath, and 5 ml of 98% sulfuric acid was added thereto dropwise in a nitrogen atmosphere while stirring. The stirring was continued at room temperature overnight, followed by drying under reduced pressure at 60° C. for 1 hour and then at 110° C. for 6 hours to remove ethanol and water to give 2E4MZ/Im.$H_2SO_4$ at a molar ratio of 1:1:2. The resulting acid-base mixture was solid at room temperature. In DSC, a sample was maintained at 100° C. to once melt, cooled to −150° C., and again heated from −150° C. up to 100° C. The sample showed only a Tg with no peak of crystallization or melting in both the cooling and the heating thermograms. The Tg was −56° C.

Example 4

Mixture of 2-ethylimidazole/4-methylimidazole and Sulfuric Acid (2EI//4MI.$H_2SO_4$; Molar Ratio=1:1:2)

A mixture of 4.51 g of 2EI and 3.85 g of 4MI (from Aldrich) was melted at 100° C., and 5 ml of 98% sulfuric acid was added thereto dropwise in a nitrogen atmosphere while stirring. After the mixture was stirred at room temperature overnight, water was removed by drying under reduced pressure at 110° C. for 6 hours to give 2EI/4MI.$H_2SO_4$ (molar ratio=1:1:2). The acid-base mixture maintained the liquid state for more than 3 months.

Example 5

Mixture of 2-ethyl-4-methylimidazole/4-methylimidazole and Sulfuric Acid (2E4MZ/4MI.$H_2SO_4$; Molar Ratio=1:1:1)

In a flask were put 10.5 g of 2E4MZ and 7.70 g of 4MI, and the 4MI was melted at 70° C. to make a uniform mixture. To the mixture was added dropwise 5 ml of 98% sulfuric acid in a nitrogen atmosphere while stirring. After a while, the viscosity increased to make stirring difficult. From the next day on, the resulting mixture 2E4MZ/4MI.$H_2SO_4$ having a molar ratio of 1:1:1 gradually solidified. It completely solidified in three months.

Example 6

Mixture of 2-ethyl-4-methylimidazole and Trifluoromethanesulfonic Acid (2E4MZ.HTf)

In 50 ml of ethanol was dissolved 62.3 g of 2E4MZ. The solution was cooled in an ice bath, and 84.9 g of HTf was added thereto in a nitrogen atmosphere while stirring. The stirring was continued at room temperature overnight. The mixture was dried at 60° C. for 1 hour and then at 110° C. for 6 hours under reduced pressure to remove ethanol and water. The resulting 2E4MZ.HTf was in a liquid state for a while but solidified in a few days. As a result of DSC, the melting point and the Tg were found to be 6° C. and −91° C., respectively. The temperature dependence of the ion conductivity of the 2E4MZ.HTf is displayed in FIGS. 1 and 4.

Example 7

Mixture of 2-ethyl-4-methylimidazole and Sulfuric Acid (2E4MZ.$H_2SO_4$)

In 10.3 g of 2E4MZ was added dropwise 5 ml of 98% sulfuric acid in a nitrogen atmosphere while stirring. After the stirring was continued at room temperature overnight, the mixture was dried at 110° C. for 6 hours under reduced pressure to remove water. The resulting 2E4MZ.$H_2SO_4$ was in a liquid state for a while but gradually solidified. In DSC, a sample was maintained at 100° C. to once melt, cooled to −150° C., and again heated from −150° C. up to 100° C. The sample showed only a Tg with no peak of crystallization or melting in both the cooling and the heating thermogram. The Tg was −58° C. The temperature dependence of the ion conductivity of the 2E4MZ.H$_2$SO$_4$ is displayed in FIGS. 1 and 5.

Example 8

Mixture of 4-methylimidazole and Sulfuric Acid (4MI.H$_2$SO$_4$)

At 100° C. was melted 23.1 g of 4MI (from Aldrich), and 15 ml of 98% sulfuric acid was added thereto dropwise in a nitrogen atmosphere while stirring. The stirring was continued at room temperature overnight. The mixture was dried at 110° C. for 6 hours under reduced pressure to remove water. The resulting 4MI.H$_2$SO$_4$ was in a liquid state for at least one week. As a result of DSC, the melting point and the Tg were found to be 29° C. and −62° C., respectively. The temperature dependence of the ion conductivity of the 4MI.H$_2$SO$_4$ is shown in FIGS. 1 and 5.

Example 9

Mixture of 2-ethyl-4-methylimidazole and Sulfuric Acid (2E4MZ.H$_2$SO$_4$; Molar Ratio=9:1)

To 2.16 g of 2E4MZ was added 0.521 g of the 2E4MZ.H$_2$SO$_4$ obtained in Example 7 to give 2E4MZ.H$_2$SO$_4$ having a molar ratio of 9:1, which maintained a liquid state for more than six months.

Example 10

Mixture of 2-ethyl-4-methylimidazole and Sulfuric Acid (2E4MZ.H$_2$SO$_4$; Molar Ratio=3:1)

To 1.19 g of 2E4MZ was added 1.15 g of the 2E4MZ.H$_2$SO$_4$ obtained in Example 7 to give 2E4MZ.H$_2$SO$_4$ having a molar ratio of 3:1, which maintained a liquid state for more than six months.

Example 11

Mixture of 2-ethyl-4-methylimidazole and Sulfuric Acid (2E4MZ.H$_2$SO$_4$; Molar Ratio=3:2)

To 0.512 g of 2E4MZ was added 1.91 g of the 2E4MZ.H$_2$SO$_4$ obtained in Example 7 to give 2E4MZ.H2SO4 having a molar ratio of 3:2, which maintained a liquid state for more than six months.

Example 12

Mixture of 2-ethyl-4-methylimidazole and Sulfuric Acid (2E4MZ.H$_2$SO$_4$; Molar Ratio=2:3)

To 2.01 g of the 2E4MZ.H$_2$SO$_4$ obtained in Example 7 was added 0.484 g of 98% sulfuric acid to give 2E4MZ.H$_2$SO$_4$ having a molar ratio of 2:3, which maintained a liquid state for more than six months.

Example 13

Mixture of 2-ethyl-4-methylimidazole and Sulfuric Acid (2E4MZ.H$_2$SO$_4$; Molar Ratio=1:3)

To 1.23 g of the 2E4MZ.H$_2$SO$_4$ obtained in Example 7 was added 1.16 g of 98% sulfuric acid to give 2E4MZ.H$_2$SO$_4$ having a molar ratio of 1:3, which maintained a liquid state for more than six months.

Example 14

Mixture of 2-ethyl-4-methylimidazole and Sulfuric Acid (2E4MZ.H$_2$SO$_4$; Molar Ratio=1:9)

To 0.510 g of the 2E4MZ.H$_2$SO$_4$ obtained in Example 7 was added 1.93 g of 98% sulfuric acid to give 2E4MZ.H$_2$SO$_4$ having a molar ratio of 1:9, which maintained a liquid state for more than six months.

Example 15

Mixture of 2-ethyl-4-methylimidazole and Trifluoromethanesulfonic Acid (2E4MZ.HTf; Molar Ratio=9:1)

To 30.1 g of 2E4MZ was added 7.92 g of the 2E4MZ.HTf obtained in Example 6 to give 2E4MZ.HTf having a molar ratio of 9:1, which maintained a liquid state for more than seven months. The temperature dependence of the ion conductivity of the resulting 2E4MZ.HTf is shown in FIG. 4.

Example 16

Mixture of 2-ethyl-4-methylimidazole and Trifluoromethanesulfonic Acid (2E4MZ.HTf; molar ratio=7:3)

In 40 ml of ethanol was dissolved 43.0 g of 2E4MZ. The solution was cooled in an ice bath, and 25 g of trifluoromethanesulfonic acid was added thereto dropwise in a nitrogen atmosphere while stirring. After the stirring was continued at room temperature overnight, the mixture was dried at 60° C. for 1 hour and then at 110° C. for 6 hours under reduced pressure to remove ethanol and water to give 2E4MZ.HTf having a molar ratio of 7:3. The temperature dependence of the ion conductivity of the resulting 2E4MZ.HTf is shown in FIG. 4.

Example 17

Mixture of 2-ethyl-4-methylimidazole and Trifluoromethanesulfonic acid (2E4MZ.HTf; Molar Ratio=7:3)

To 1.71 g of 2E4MZ was added 3.01 g of the 2E4MZ.HTf obtained in Example 6 to give 2E4MZ.HTf having a molar ratio of 7:3, which maintained a liquid state for more than seven months.

Example 18

Mixture of 2-ethyl-4-methylimidazole and Trifluoromethanesulfonic Acid (2E4MZ.HTf; Molar Ratio=4:6)

To 4.01 g of the 2E4MZ.HTf obtained in Example 6 was added 1.17 g of trifluoromethanesulfonic acid to give 2E4MZ.HTf having a molar ratio of 4:6, which maintained a liquid state for more than six months.

Example 19

Mixture of 2-ethyl-4-methylimidazole and Trifluoromethanesulfonic Acid (2E4MZ.HTf; Molar Ratio=3:7)

To 3.05 g of the 2E4MZ.HTf obtained in Example 6 was added 2.35 g of trifluoromethanesulfonic acid to give 2E4MZ.HTf having a molar ratio of 3:7, which maintained a liquid state for more than six months.

Example 20

Mixture of 2-ethyl-4-methylimidazole and Trifluoromethanesulfonic acid (2E4MZ.HTf; Molar Ratio=2:8)

To 2.02 g of the 2E4MZ.HTf obtained in Example 6 was added 3.54 g of trifluoromethanesulfonic acid to give 2E4MZ.HTf having a molar ratio of 2:8, which maintained a liquid state for more than six months.

Example 21

Mixture of 2-ethyl-4-methylimidazole and Methanesulfonic Acid (2E4MZ.CH$_3$SO$_3$H)

In an ice bath was cooled 6.62 g of 2E4MZ, and 5.78 g of methanesulfonic acid (from Aldrich) was added thereto dropwise in a nitrogen atmosphere while stirring. Stirring was continued at room temperature overnight. As a result of DSC, the resulting 2E4MZ.CH$_3$SO$_3$H was found to have a melting point of 56° C. and a Tg of −63° C.

Example 22

Mixture of 2-ethyl-4-methylimidazole and Methanesulfonic Acid (2E4MZ.CH$_3$SO$_3$H; Molar Ratio=7:3)

To 2.02 g of the 2E4MZ.CH$_3$SO$_3$H obtained in Example 21 was added 1.44 g of 2E4MZ to give 2E4MZ.CH$_3$SO$_3$H having a molar ratio of 7:3, which maintained a liquid state for more than seven months.

Example 23

Mixture of 2-ethyl-4-methylimidazole and Methanesulfonic Acid (2E4MZ.CH$_3$SO$_3$H; Molar Ratio=4:6)

To 1.03 g of the 2E4MZ.CH$_3$SO$_3$H obtained in Example 21 was added 0.244 g of methanesulfonic acid to give 2E4MZ.CH$_3$SO$_3$H having a molar ratio of 4:6, which maintained a liquid state for more than seven months.

Example 24

Mixture of 2-ethyl-4-methylimidazole and Methanesulfonic Acid (2E4MZ.CH$_3$SO$_3$H; Molar Ratio=3:7)

To 2.00 g of the 2E4MZ.CH$_3$SO$_3$H obtained in Example 21 was added 1.25 g of methanesulfonic acid to give 2E4MZ.CH$_3$SO$_3$H having a molar ratio of 3:7, which maintained a liquid state for more than seven months.

Example 25

Mixture of 2-ethyl-4-methylimidazole and Methanesulfonic Acid (2E4MZ.CH$_3$SO$_3$H; Molar Ratio=2:8)

To 1.09 g of the 2E4MZ.CH$_3$SO$_3$H obtained in Example 21 was added 1.53 g of methanesulfonic acid to give 2E4MZ.CH$_3$SO$_3$H having a molar ratio of 2:8, which maintained a liquid state for more than seven months.

Comparative Example 1

Mixture of 2-ethylimidazole and Sulfuric Acid (2EI.H$_2$SO$_4$)

2EI (Aldrich) (27.1 g) was melted at 100° C., and 15 ml of 98% sulfuric acid was added thereto dropwise in a nitrogen atmosphere while stirring. The mixture was stirred at room temperature overnight, followed by drying under reduced pressure at 110° C. for 6 hours to remove water. The resulting 2EI.H$_2$SO$_4$ was in a liquid state for a while but solidified in a few days. As a result of DSC, the melting point and the Tg were found to be 50° C. and −64° C., respectively. The temperature dependence of the ion conductivity of the 2EI.H$_2$SO$_4$ is shown in FIGS. 1, 4, and 5. The 2EI.H$_2$SO$_4$ largely reduced the ion conductivity in a temperature region at and below the melting point.

Reference Example 1

Mixture of Imidazole and Sulfuric Acid/Phosphoric Acid (Im.H$_2$SO$_4$/H$_3$PO$_4$; Molar Ratio=2:1:1)

To 12.7 g of Im (from Sigma) was added dropwise 10.85 g of a 85% phosphoric acid aqueous solution and mixed. To the mixture was added dropwise 5 ml of 98% sulfuric acid, followed by stirring overnight. The mixture was dried under reduced pressure at 80° C. for 1 hour and then at 110° C. for 6 hours to remove water to give Im.H$_2$SO$_4$/H$_3$PO$_4$ having a molar ratio of 2:1:1. When allowed to stand overnight, the Im.H$_2$SO$_4$/H$_3$PO$_4$ solidified.

Reference Example 2

Thermogravimetric Analysis

The results of thermogravimetric analysis on the acid-base mixtures of Examples 1, 7, and 8 are shown in FIG. 2.

Reference Example 3

Thermogravimetric Analysis

The results of thermogravimetric analysis on the acid-base mixtures of Examples 2 and 3 and Comparative Example 1 are shown in FIG. 3.

Reference Example 4

Thermogravimetric Analysis

The results of thermogravimetric analysis on the acid-base mixtures of Examples 6, 21, 22, and 24, 2E4MZ, and methanesulfonic acid are shown in FIG. 6.

Reference Example 5

Thermogravimetric Analysis

The results of thermogravimetric analysis on the acid-base mixtures of Examples 7, 10, and 11 are shown in FIG. 7.

Reference Example 6

Thermogravimetric Analysis

The results of thermogravimetric analysis on the acid-base mixtures of Examples 7 and 8 and Comparative Example 1 are shown in FIG. 8.

Industrial Applicability:

The acid-base mixture according to the present invention is excellent in heat resistance and exhibits high ion conductivity without water or a solvent and is therefore useful as an ion conductor or a proton conductor in fuel cells, secondary batteries, electric double layer capacitors, and electrolytic capacitors.

The acid-base mixture of the present invention can be utilized in the above-described applications as a polymer composite membrane obtained by solution casting wherein the acid-base mixture and polymers are used or a polymer electrolyte membrane obtained by infiltrating the acid-base mixture into a porous polymer membrane.

The invention claimed is:

1. An ion conductor, consisting of an acid-base mixture, the mixture consisting of:
   a base component consisting of a mixture of unsubstituted imidazole and at least one selected from the group consisting of: 2-ethyl-4-methylimidazole, 4-methylimidazole, 2-ethylimidazole, and mixtures thereof, and
   an acid component selected from the group consisting of: sulfuric acid, trifluoromethane sulfonic acid, methanesulfonic acid and mixtures thereof,
   wherein, the acid-base mixture is ion conductive and has an ion conductivity of $10^{-4}$ Scm$^{-1}$ or higher at 100° C., the amount of unsubstituted imidazole is 60% or less by total weight of the base component, and the acid-base mixture is a liquid at 120° C. or lower.

2. The ion conductor according to claim 1, wherein the acid-base mixture is liquid at room temperature.

3. The ion conductor according to claim 1, wherein the acid-base mixture has no melting point.

4. The inn conductor according to claim 1, wherein the base component and the acid component are present in a molar ratio from 99:1 to 1:99.

5. The ion conductor according to claim 1, wherein the base component and the acid component are present in a molar ratio from 95:1 to 1:5.

6. The ion conductor according to claim 1, wherein the acid component is at least one selected from the group consisting of sulfuric acid and trifluoromethanesulfonic acid.

7. The ion conductor according to claim 1, wherein the base component and the acid component are present in an equimolar ratio.

8. The ion conductor according to claim 1, wherein the base component and the acid component are present in a molar ratio from 9:1 to 1:9.

9. A fuel cell, a secondary battery, an electric double layer capacitor, or an electrolytic capacitor comprising an ion conductor as an electrolyte, said ion conductor consisting of an acid-base mil-cure, the mixture consisting of: a base component consisting of a mixture of unsubstituted imidazole and at least one selected from the group consisting of: 2-ethyl-4-methylimidazole, 4-methylimidazole, 2-ethylimidazole, and mixtures thereof, and
   an acid component selected from the group consisting of: sulfuric acid, trifluoromethane sulfonic acid, methanesulfonic acid and mixtures thereof,
   wherein, said ion conductor has a melting point of 120° C. or lower or no melting point, and a glass transition temperature of 25° C. nr lower,
   the amount of unsubstituted imidazole is 60% or less by total weight of the base component, and
   the acid-base mixture is a liquid at 120° C. or lower.

10. The fuel cell, secondary battery, electric double layer capacitor or electrolytic capacitor according to claim 9, wherein the acid-base mixture is liquid at room temperature.

11. The fuel cell, secondary battery, electric double layer capacitor electrolytic or capacitor according to claim 9, wherein the acid-base mixture has no melting point.

12. The fuel cell, secondary battery, electric double layer capacitor or electrolytic capacitor according to claim 9, wherein the base component and the acid component are present in a molar ratio from 99:1 to 1:99.

13. The fuel cell, secondary battery, electric double layer capacitor or electrolytic capacitor according to claim 9, wherein the base component and the acid component are present in a molar ratio from 95:1 to 1:95.

14. The fuel cell, secondary battery, electric double layer capacitor or electrolytic capacitor according to claim 9, wherein the acid component is at least one selected from the group consisting of sulfuric acid and trifluoromethanesulfonic acid.

15. The fuel cell, secondary battery, electric double layer capacitor or electrolytic capacitor according to claim 9, wherein the base component and the acid component are present in an equimolar ratio.

16. The fuel cell, secondary battery, electric double layer capacitor or electrolytic capacitor according to claim 9, wherein the base component and the acid component are present in a molar ratio from 9:1 to 1:9.

* * * * *